US012725865B2

(12) United States Patent
Hoffmann

(10) Patent No.: US 12,725,865 B2
(45) Date of Patent: Sep. 1, 2026

(54) BATTERY MODULE WITH AIR COOLING CAPABILITY

(71) Applicant: VARTA Microbattery GmbH, Ellwangen Jagst (DE)

(72) Inventor: Tim Hoffmann, Neresheim (DE)

(73) Assignee: VARTA Microbattery GmbH, Ellwangen Jagst (DE)

( * ) Notice: Subject to any disclaimer, the term of this patent is extended or adjusted under 35 U.S.C. 154(b) by 795 days.

(21) Appl. No.: 18/010,863

(22) PCT Filed: Jun. 14, 2021

(86) PCT No.: PCT/EP2021/065915
§ 371 (c)(1),
(2) Date: Dec. 16, 2022

(87) PCT Pub. No.: WO2021/254941
PCT Pub. Date: Dec. 23, 2021

(65) Prior Publication Data

US 2023/0238633 A1 Jul. 27, 2023

(30) Foreign Application Priority Data

Jun. 18, 2020 (EP) .................................... 20180686

(51) Int. Cl.
*H01M 50/213* (2021.01)
*H01M 10/613* (2014.01)
(Continued)

(52) U.S. Cl.
CPC ....... *H01M 50/213* (2021.01); *H01M 10/613* (2015.04); *H01M 10/643* (2015.04);
(Continued)

(58) Field of Classification Search
CPC ..... H01M 50/213; H01M 50/289–293; H01M 10/6563–6565; H01M 10/643; H01M 10/6557
See application file for complete search history.

(56) References Cited

U.S. PATENT DOCUMENTS 5,490,572 A 2/1996 Tajiri et al.
5,578,392 A 11/1996 Kawamura
(Continued)

FOREIGN PATENT DOCUMENTS

CN 1134042 A 10/1996
DE 10 2005 047 034 4/2006
(Continued)

OTHER PUBLICATIONS

International Search Report dated Aug. 19, 2021, of corresponding International Application No. PCT/EP2021/065915, with English translation.

(Continued)

*Primary Examiner* — Robert S Carrico
(74) *Attorney, Agent, or Firm* — DLA Piper LLP (US)

(57) ABSTRACT

A battery module with air cooling capability that includes at least two battery blocks; the battery blocks each include a plurality of cylindrical round cells arranged in corresponding receptacles of a cell holder, wherein longitudinal axes of the cylindrical round cells lie parallel to one another; air passage openings are provided in the cell holders, through which air can flow through the battery blocks in parallel to the longitudinal axes of the round cells; the battery blocks are stacked on one another with spacing so that a stack intermediate space results between adjacent battery blocks in the stack; a housing, including the stack made up of the battery blocks, wherein the stack is spaced apart from walls of the housing so that two terminal free spaces result between terminal battery blocks of the stack and the walls;
(Continued)

the housing has at least one air inlet and at least one air outlet; a fan is assigned to the battery module to generate an airflow between the air inlet and the air outlet, and guiding means that ensure that the airflow is guided starting from at least one stack intermediate space between two adjacent battery blocks through the air passage openings in the cell holders between the cylindrical round cells of the individual battery blocks and through the terminal free spaces in a direction of the air outlet.

12 Claims, 6 Drawing Sheets

(51) Int. Cl.

| | |
|---|---|
| ***H01M 10/643*** | (2014.01) |
| ***H01M 10/6557*** | (2014.01) |
| ***H01M 10/6563*** | (2014.01) |
| ***H01M 10/6566*** | (2014.01) |
| ***H01M 50/227*** | (2021.01) |
| ***H01M 50/291*** | (2021.01) |
| ***H01M 50/293*** | (2021.01) |

(52) U.S. Cl.

CPC ... *H01M 10/6557* (2015.04); *H01M 10/6563* (2015.04); *H01M 10/6566* (2015.04); *H01M 50/227* (2021.01); *H01M 50/291* (2021.01); *H01M 50/293* (2021.01)

(56) References Cited

U.S. PATENT DOCUMENTS

| | | | | |
|---|---|---|---|---|
| 2006/0073378 | A1 | 4/2006 | Hamery et al. | |
| 2008/0268328 | A1* | 10/2008 | Lee | H01M 10/6566 429/83 |
| 2010/0059299 | A1 | 3/2010 | Hoermandinger et al. | |
| 2012/0263991 | A1 | 10/2012 | Temmyo et al. | |
| 2015/0207186 | A1 | 7/2015 | Schmidt et al. | |
| 2017/0018750 | A1* | 1/2017 | Wintner | H01M 50/522 |
| 2020/0076022 | A1* | 3/2020 | Kawakami | H01M 50/581 |

FOREIGN PATENT DOCUMENTS

| | | | | |
|---|---|---|---|---|
| DE | 10 2007 024 869 | | 12/2008 | |
| DE | 10 2008 051 085 | | 4/2010 | |
| DE | 10 2014 201 165 | | 8/2015 | |
| DE | 10 2014 112 628 | | 3/2016 | |
| DE | 20 2018 005 411 | | 2/2019 | |
| EP | 1 026 770 | | 8/2000 | |
| EP | 1 202 359 | | 5/2002 | |
| JP | H097564 | A | 1/1997 | |
| KR | 20180101668 | A * | 9/2018 | H01M 50/24 |
| WO | 2013/023847 | | 2/2013 | |
| WO | 2013/134808 | | 9/2013 | |
| WO | WO-2013134808 | A1 * | 9/2013 | H01M 50/583 |

OTHER PUBLICATIONS

Office Action mailed Nov. 3, 2025, from counterpart Chinese Application No. 202180043118.0.

* cited by examiner

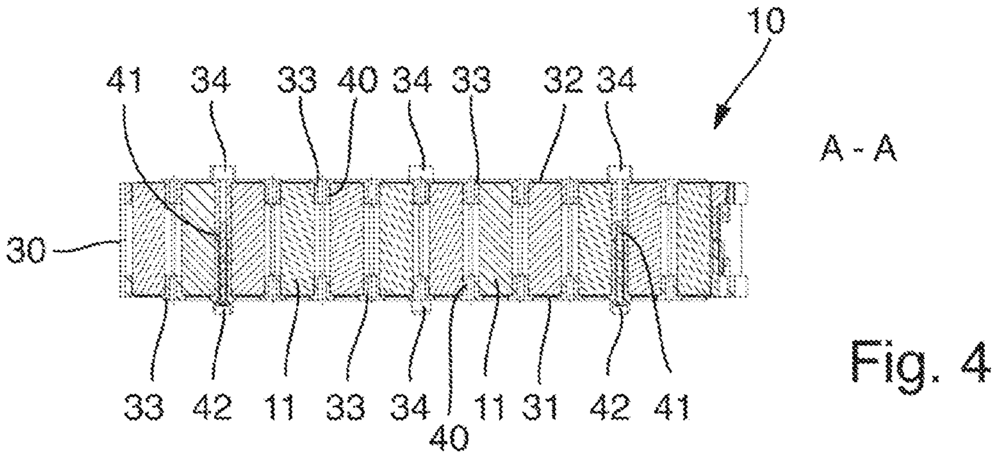
Fig. 4
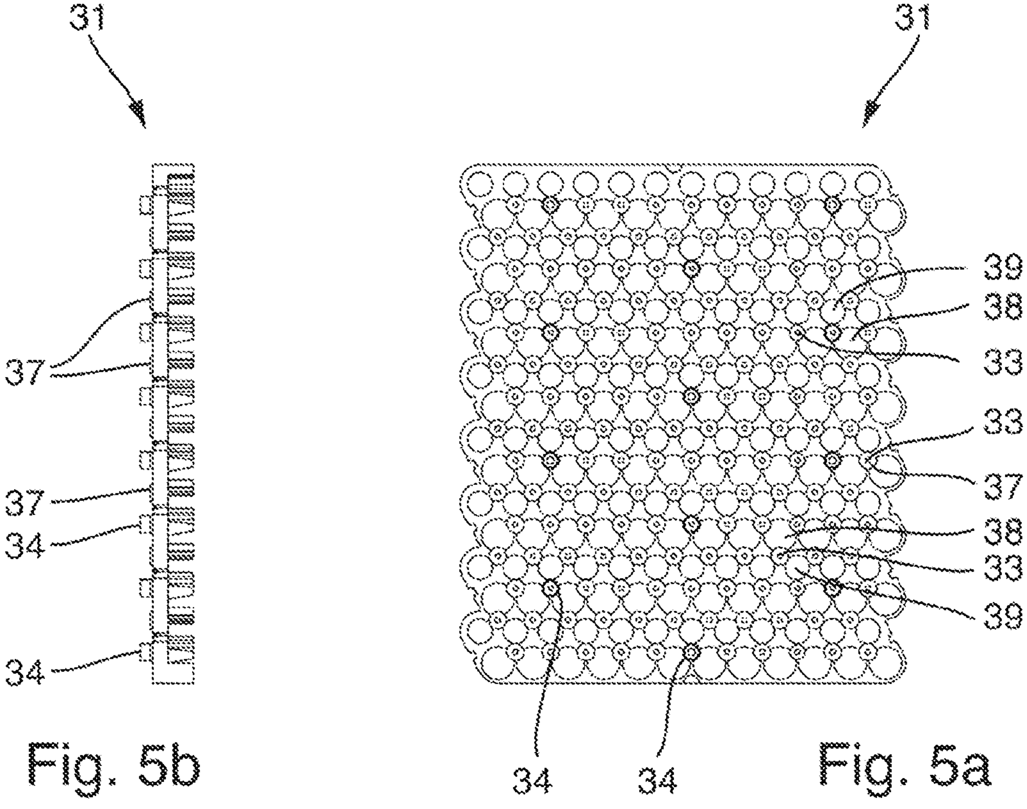
Fig. 5b
Fig. 5a

BATTERY MODULE WITH AIR COOLING CAPABILITY

TECHNICAL FIELD

This disclosure relates to a battery module with air cooling capability that comprises at least two battery blocks each having a plurality of cylindrical round cells and, furthermore, relates to a cell holder that arranges cylindrical round cells in the form of a battery block.

BACKGROUND

Battery modules are often rechargeable, electrical energy storage devices often used, for example, in automotive applications but also in many other fields. In a battery module, a large number of individual electrochemical cells are interconnected, to thus be able to provide the high currents and voltages required for various applications.

Each electrochemical cell comprises at least one positive and at least one negative electrode that are separated from one another by a separator. An electrochemical, energy-supplying reaction takes place in electrochemical cells, which is composed of two partial reactions that are electrically coupled to one another but spatially separated from one another. One partial reaction taking place at comparatively lower redox potential runs at the negative electrode, one at comparatively higher redox potential at the positive electrode. During the discharge, electrons are released at the negative electrode by an oxidation process, resulting in an electron flow via an external consumer to the positive electrode, by which a corresponding quantity of electrons is absorbed. A reduction process thus takes place at the positive electrode. At the same time, for the purposes of charge equalization, an ion flow corresponding to the electrode reaction takes place inside the electrochemical cell. This ion flow traverses the separator and is ensured by an ion-conducting electrolyte.

In secondary (rechargeable) electrochemical cells, the discharge reaction is reversible. There is, thus, the possibility of reversing the conversion of chemical energy into electrical energy that takes place during the discharge.

An electrochemical cell often used in battery modules is a lithium-ion cell. This comprises electrodes that can reversibly absorb lithium ions and emit them again, and an electrolyte containing lithium ions.

Various structural forms are known in electrochemical cells and in particular also in lithium-ion cells. In addition to prismatic shapes, button cells and cylindrical round cells are widespread. Both button cells and round cells have a circular footprint. Cylindrical round cells differ from button cells in that button cells have a height which is less than their diameter. In contrast, cylindrical round cells have a height that is greater than their diameter.

Heat arises during the operation of electrochemical cells and in particular during the operation of a battery module. The cells heat up both during the energy emission and during charging. Overheating results in negative effects and damage of the electrochemical cells. However, an excessively low temperature can also negatively influence the charging process, for example. For safe and careful operation of the battery module, a certain operating temperature range is therefore to be maintained so that measures for temperature control of battery modules are advisable.

Using cooling and refrigerating circuits to cool the electrochemical cells of a battery module heating up in operation is known. For example, cooling or refrigerating plates can be used, on which the lower sides of the battery modules are pressed for heat dissipation.

Other approaches work with the introduction of a liquid coolant directly into the battery module. For example, a battery module for electrical devices is known from DE 10 2007 024 869 A, wherein a coolant is conducted through the housing of the module.

DE 10 2014 112 628 A1 describes a battery module that can be cooled, wherein the battery module has two holding plates arranged at a distance to one another and a plurality of electrical round cells that penetrate passages in the holding plates to form a seal at the ends. A chamber penetrated by the electrical cells is formed between the holding plates, which is formed to accommodate an electrically conductive coolant flowing around the electrical cells. The terminal cell poles of the electrical cells are arranged outside this chamber. The coolant is preferably a coolant based on ethylene glycol.

Furthermore, air cooling of battery modules is known. Thus, WO 2013/023847 A1 describes a battery module in particular for motor vehicles having a battery cell stack made of preferably prismatic battery cells, wherein air channels are located between the battery cells. Sufficient cooling of the battery cells by an airflow is to be enabled in this way.

DE 10 2014 201 165 A1 proposes a battery module that comprises a number of battery cells electrically interconnected with one another. The individual battery cells are temperature-controlled by an airflow flowing through channels that extend essentially along the battery cells. The battery cells are housed in individual battery cell compartments of a battery cell holder. The channels, through which the cooling air flows are located in the side walls of the battery cell compartments. For a sufficient cooling effect, the material of the battery cell holder has to have good heat conduction properties.

DE 20 2018 005 411 U1 describes a battery module having cylindrical round cells without a conventionally used housing, wherein the housing functions are taken over by a self-supporting holding matrix made of plastic. Individual modules can be plugged together to form so-called battery packs. The planar distance between two planes of the plugged-together modules can be used as an air channel for air cooling.

Known solutions for cooling a battery module having cylindrical round cells have up to this point not provided satisfactory solutions in particular in air cooling. If the airflow enters at one side of the battery module, there is direct incident flow against the cell jackets of the cells. A certain cooling effect is initially achieved in this way, but the cooling air is already heated close to the air inlet by the waste heat of the cells. This already heated cooling air cools the cells arranged in the middle and rear region of the module less well. A temperature gradient forms from the air inlet to the air outlet over the entire battery module. It is particularly disadvantageous that the temperature distribution is uneven over the entire battery module so that how well the cells are cooled in the different regions of the module differs. In poorly cooled cells, this has a negative effect on the cycle behavior of the cells and therefore on their service life since hotter or poorly cooled cells are known to age significantly faster than well cooled cells. In the course of the operational life, the cells of a battery module therefore age in different ways.

It could therefore be helpful to provide a battery module having round cells having an improved air cooling capability. In particular, uniform cooling of all cells of the module is to be achieved by the air cooling capability.

SUMMARY

I provide a battery module with air cooling capability including:

a. at least two battery blocks,
b. the battery blocks each include a plurality of cylindrical round cells arranged in corresponding receptacles of a cell holder, wherein longitudinal axes of the cylindrical round cells lie parallel to one another,
c. air passage openings are provided in the cell holders, through which air can flow through the battery blocks in parallel to the longitudinal axes of the round cells,
d. the battery blocks are stacked on one another with spacing so that a stack intermediate space results between adjacent battery blocks in the stack,
e. a housing including the stack made up of the battery blocks, wherein the stack is spaced apart from walls of the housing so that two terminal free spaces result between terminal battery blocks of the stack and the walls,
f. the housing has at least one air inlet and at least one air outlet,
g. a fan is assigned to the battery module to generate an airflow between the air inlet and the air outlet, and
h. guiding means that ensure that the airflow is guided starting from at least one stack intermediate space between two adjacent battery blocks through the air passage openings in the cell holders between the cylindrical round cells of the individual battery blocks and through the terminal free spaces in a direction of the air outlet.

I also provide a cell holder that accommodates a plurality of cylindrical round cells that arrange the cylindrical round cells in the form of a battery block, wherein:

a. the cell holder includes receptacles that hold the cylindrical round cells, wherein longitudinal axes of the cylindrical round cells lie parallel to one another, and
b. air passage openings are provided in the cell holder through which air can flow through the battery block in parallel to the longitudinal axes of the round cells.

BRIEF DESCRIPTION OF THE DRAWINGS

FIG. 4 shows a sectional view through the battery block from FIG. 2 along A-A.

FIGS. 5*a* and 5*b* show a top view (A) and side view (B) of a lower cell holder part.

DETAILED DESCRIPTION

Figure 1:
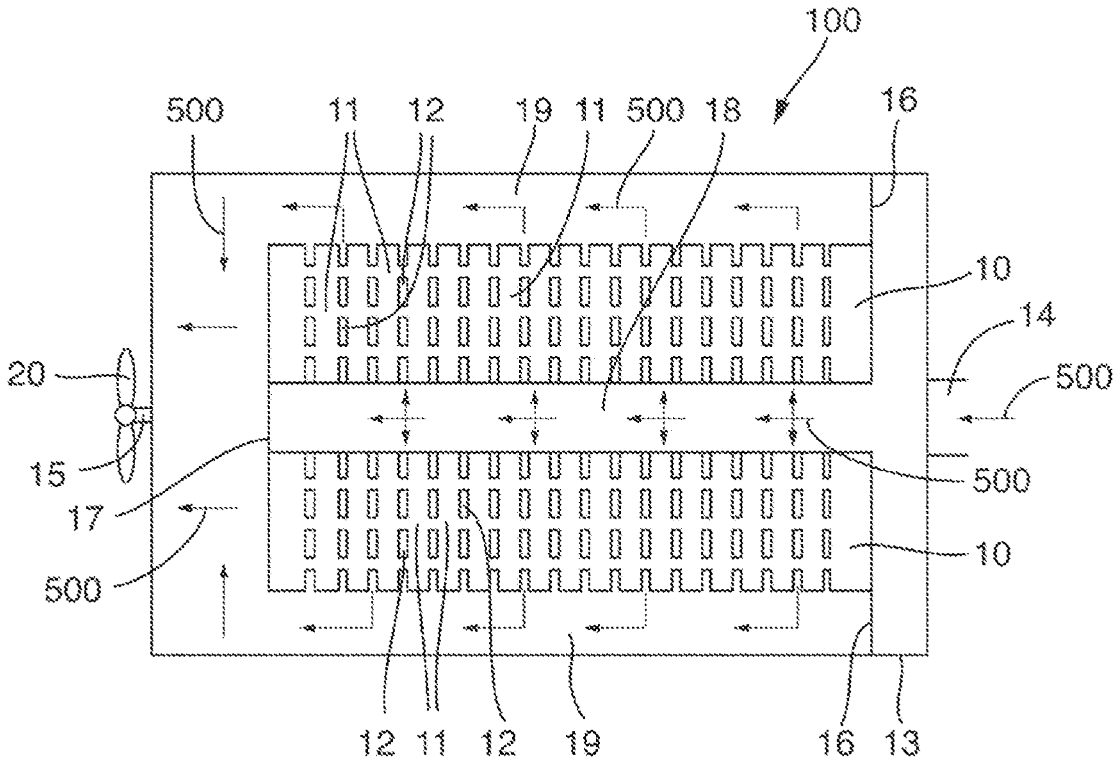
FIG. 1 shows a schematic sectional view through a battery module to illustrate the guiding of the airflow.

My battery module works with an air cooling capability and is primarily distinguished by a. to h.:

a. the battery module has at least two battery blocks,
b. the battery blocks each comprise a plurality of cylindrical round cells arranged in corresponding receptacles of a cell holder, wherein the longitudinal axes of the cylindrical round cells lie in parallel to one another,
c. air passage openings are provided in the cell holders through which air can flow through the battery blocks in parallel to the longitudinal axes of the round cells,
d. the battery blocks are stacked on one another with spacing so that a stack intermediate space results between adjacent battery blocks in the stack,
e. the battery module has a housing that comprises the stack made up of the battery blocks, wherein the stack is spaced apart from walls of the housing so that two terminal free spaces result between terminal battery blocks of the stack and the walls,
f. the housing has at least one air inlet and at least one air outlet,
g. a fan is assigned to the battery module to generate an airflow between the air inlet and the air outlet, and
h. the battery module has guiding means that ensure that the airflow is conducted starting from at least one stack intermediate space between two adjacent battery blocks through the air passage openings in the cell holders between the cylindrical round cells of the individual battery blocks and through the terminal free spaces in the direction of the air outlet.

A cooling principle is provided by these features of the battery module in which the cylindrical round cells of the battery module are actively cooled by an airflow within the module. The airflow itself within the battery module is generated via a conventional fan. The round cells and the surrounding housing parts of the battery module are arranged here such that the airflow cools both the cell poles and the cell jackets.

Due to the introduction of the airflow into the stack intermediate space between two adjacent battery blocks, the airflow initially reaches the cell poles that adjoin the stack intermediate space. Subsequently, the air passes through the air passage openings into the spaces between the round cells and skims past the cell jackets. The air passage openings are preferably uniformly distributed over the area of the battery block or over the area of the cell holder surface. The cooling of the cell jackets takes place indirectly to a certain extent in this cooling principle, in that the airflow is conducted through the air passage openings into the cell holders past the cell jackets. The air skims through the entire battery block. On the opposite side of the battery block, the air exits from the battery block to leave the battery module again on this side via the intermediate space between this side of the battery block and the inner wall of the housing (terminal free space) in the direction of the air outlet.

A battery block is as an arrangement of a plurality of cylindrical round cells, the longitudinal axes of which lie in parallel to one another. These cylindrical round cells are preferably arranged within the battery block in a regular pattern in a plane. The round cells within a battery block are interconnected with one another.

A battery module is a combination of two or possibly more battery blocks. These two or more battery blocks are located within a housing and form a unit. A battery module can also be referred to synonymously as a battery pack.

Preferably, the battery module can comprise two battery blocks. The terminal free spaces, thus the free spaces between the respective battery block and the respective wall of the housing, can form the upper side and the lower side of the battery module here. The air is introduced into the stack intermediate space between the battery blocks, thus in a sense into the center of the battery module, runs through the battery blocks past the cell jackets, and leaves the battery blocks at the upper side and the lower side of the battery module, wherein the air is then conducted along the upper side and lower side of the module in the direction of the air outlet. In this configuration, the air inlet and the air outlet are located on the opposite narrow sides of the battery module.

However, it is also possible that more than two battery blocks are combined in a battery module.

The generation of the airflow, which is conducted according to the described principle through the battery module, can in principle be generated arbitrarily. In particular, it is possible that the cooling air is blown into the battery module or suctioned through it by a corresponding arrangement of fans. A fan or blower can thus be attached either at the air inlet or at the air outlet so that the direction of the airflow can be selected specifically by application. A combination of blowing-in and suctioning-out is also possible in principle. The arrangement of a fan at the air outlet has proven to be particularly suitable, using which the air is suctioned through the battery module. Various structural forms of fans can be used here.

The battery module is provided for an interconnection of a plurality of rechargeable, electrical energy storage elements, in particular a plurality of rechargeable, cylindrical round cells. The round cells are arranged within a battery block by parallel arrangement of their longitudinal axes preferably in a regular pattern such that regular intermediate spaces are formed between the cell jackets of the individual round cells, through which the cooling air can pass. This arrangement of the round cells is carried out with the aid of cell holders. The cell holder has, in particular in the regions which adjoin the intermediate spaces between the individual round cells, air passage openings that enable an air entry and an air exit in the intermediate spaces between the cell jackets. Due to the guiding of the airflow in the described manner, the round cells are uniformly cooled by fresh cooling air since they have indirect incident flow. This causes homogeneous cooling of the round cells over the entire arrangement of the round cells within the battery blocks so that uniform cooling is achieved for all round cells by this homogeneous cooling and thus the service life of all round cells is optimized in a uniform manner.

The round cells themselves can in principle be arbitrary round cells in arbitrary dimensions. Commercially available round cells are preferably used for the battery blocks.

The height of the round cells is preferably 15 mm to 150 mm. The diameter of the cylindrical round cells is preferably 10 mm to 50 mm. Within these ranges, form factors of, for example, 18×65 (diameter×height in mm) or 21×70 (diameter×height in mm) are particularly preferred. Cylindrical round cells having these form factors, in particular having the form factor 18×65, are particularly suitable for forming the battery module and can be used, for example, for the power supply of electric drives of motor vehicles, but also of tools and for other energy-intensive applications.

The rated capacity of the energy storage element formed as a cylindrical round cell is in general up to 6000 mAh in an example as a lithium-ion cell. Using the form factor of, for example, 21×70, the cell in an example as a lithium-ion cell preferably has a rated capacity 2000 mAh to 5000 mAh, particularly preferably 3000 to 4500 mAh.

In the European Union, producer specifications on specifications relating to the rated capacities of secondary energy storage elements are strictly regulated. Thus, for example, specifications on the rated capacity of secondary nickel-cadmium cells have to be based on measurements according to the standards IEC/EN 61951-1 and IEC/EN 60622, specifications on the rated capacity of secondary nickel-metal hydride cells have to be based on measurements according to the standard IEC/EN 61951-2, specifications on the rated capacity of secondary lithium cells have to be based on measurements according to the standard IEC/EN 61960, and specifications on the rated capacity of secondary lead-acid cells have to be based on measurements according to the standard IEC/EN 61056-1. The specifications on rated capacities herein are preferably also based on these standards.

The number of the round cells interconnected with one another in a battery block of my battery module can be selected arbitrarily in principle. The individual round cells are preferably arranged in rows, wherein a plurality of rows is provided. For example, rows of twelve round cells each can be provided, wherein a total of sixteen of these rows are interconnected with one another to form a battery block. A preferred number of 192 round cells within a battery block results therefrom.

Depending on the application and required energy demand, multiple energy modules can be combined in the form of single racks or the like.

Particularly preferably, the battery module is distinguished by the following additional a.:

a. the guiding means are arranged peripherally on three sides in the stack intermediate space between two battery blocks located one on top of the other and/or peripherally on three sides in the terminal free space between a terminal battery block of a stack and the wall of the housing.

Due to the configuration of the guiding means in this form, in a way a three-sided narrow frame is provided in the region between battery blocks located one on top of the other and in the region between a terminal battery block and the respective wall of the housing. The guiding means are designed so that they prevent air passage. Air passage is possible on the respective open side of the three-sided frame.

Particularly preferably, the guiding means are designed according to at least one of a.-b.:

a. the guiding means in the stack intermediate space between two battery blocks located one on top of the other leave the side of the stack free which faces toward the air inlet of the housing, and
b. the guiding means in the terminal free space between a terminal battery block of the stack and the walls of the housing leave the side of the stack free which faces toward the air outlet of the housing.

The above-mentioned a. and b. are preferably implemented jointly here.

Due to this arrangement of the guiding means, in a particularly advantageous manner, the air which flows through the air inlet into the battery module is guided into the stack intermediate space. Due to the delimitation on the three other sides of the stack intermediate space, the air is forced into the battery blocks and passes through the spaces between the individual round cells of a battery block. The air leaves the battery blocks on the other side of the battery block. The air is conducted in the direction of the air outlet by the guiding means arranged in this terminal free space since the three other sides in the terminal free space are closed by the guiding means.

With regard to these guiding means, the battery module is preferably characterized by the following additional a.:

a. the guiding means are sealing means formed by a flexible material, preferably by a foamed plastic.

Due to the configuration of the guiding means in the form of a flexible material, preferably in the form of foamed plastic (foam), on the one hand, the air passage is reliably prevented in these regions. On the other hand, a certain cushion effect is achieved by the flexible material so that during the installation of the battery module the surfaces of the battery modules not completely flat are reliably sealed. Moreover, due to the configuration of the guiding means as a three-sided frame, for example, made of foam, an installation of the guiding means is possible in a very simple manner that can be automated. A corresponding precut frame made of foam, thus in a way three strips made of foam in perpendicular arrangement, can be laid on the battery modules or the corresponding inner sides of the housing. By assembling and fixing the battery modules with the housing, the desired sealing and guiding of the airflow is achieved in a simple manner.

Preferably, the cell holder or holders of the battery module, using which the battery blocks are formed, is/are distinguished by the following additional a.:

a. the cell holder of a battery block is formed in two parts having a first cell holder part and a second cell holder part, wherein the first cell holder part and the second cell holder part each enclose the opposing end faces of the round cells of a battery block.

Using such a configuration of the cell holder in two-part form, it is possible in a particularly simple and practical manner to arrange and fix the round cells of a battery block in a suitable manner. This configuration of the cell holder permits particularly simple installation here, which is also accessible to automation. Thus, in particular the round cells can be placed in one of the cell holder parts, in particular into a lower cell holder part, by hand or else by machine. Subsequently, the second cell holder part, in particular an upper cell holder part, can be put on and fixed in a suitable manner so that the round cells are held inside the battery block reliably in the desired pattern or the desired arrangement.

Particularly preferably, the battery module is distinguished with regard to this configuration of the cell holder by the following additional a.:

a. screw connections, in particular screw connections having self-tapping screws, are provided to fix the first cell holder part and the second cell holder part.

With this preferred fixing of screw connections, corresponding channels are expediently provided in the cell holder, in which the screw connections engage. In particular, channels can be provided that pass through the entire height of the respective cell holder part. When the first cell holder part and the second cell holder part are joined together, these channels, which can be provided at multiple points of the cell holder, are guided together such that they form a continuous channel over the height of the resulting battery block, in which the connecting screw connections can engage. The use of self-tapping screws is particularly advantageous here since threads can be omitted so that the manufacturing of corresponding cell holders is particularly simple and cost-effective.

Further particularly preferably, the battery module is distinguished with regard to the cell holder by additional a.:

a. the cell holders have recesses, in particular circular recesses, for electrically contacting the round cells.

The arrangement of corresponding recesses, in particular of circular recesses, in addition to the possibility of electrically contacting the round cells, also facilitates the placing of the round cells into the cell holder during the assembly of the battery module. These recesses in a way predetermine the pattern in which the round cells are to be arranged on the surface of the cell holder. The round cells are inserted with the corresponding pole into these recesses here. It can be provided that larger recesses, in particular larger circular recesses, are provided for the negative poles of the round cells and smaller recesses, in particular smaller circular recesses, are provided for the raised or protruding positive poles of the round cells. Therefore, on the one hand, the orientation of the round cells in the cell holder is predetermined by the corresponding recesses. On the other hand, a first fixation of the round cells is already achieved during the assembly of the battery block by the smaller recesses in which the positive poles of the round cells can engage.

With regard to the cell holder, the battery module is preferably furthermore distinguished by additional a.:

a. the regions of the air passage openings of a cell holder are each formed by a nozzle for forming air entry and air exit channels, wherein one nozzle adjoins three round cells of the respective battery block in each case.

The nozzles protrude into the interior of the cell holder and are significantly shorter than the length of the cylindrical base body of the round cells. It can thus be provided, for example, that the length of the nozzles of the upper cell holder part and the length of the nozzles of the lower cell holder part, taken together, cover a third or less of the length of the round cells fixed between these nozzles. In this way, a large fraction of the cell jacket surface of the round cells has the air flowing through freely flowing around it.

Due to the configuration of the air passage openings of a cell holder in the form of a nozzle, on the one hand, the guiding of the airflow is channeled in these regions and thus particularly effective conduction of the airflow is achieved according to the described principle. On the other hand, simple holding of the round cells by the cell holder is achieved by the configuration of these regions in the form of nozzles. By three round cells adjoining each nozzle, delimiting and fixing of the round cells in the desired position is achieved, without further holding means being required. The nozzles thus form, together with the preferably provided recesses in the cell holder in this example, the receptacles of the cell holder for the round cells according to feature b. above.

The external geometry of the nozzles can have a circular periphery. This simple configuration of the nozzles is already sufficient to achieve effective holding and fixing of the round cells in the desired pattern. In other configurations, it can be provided, for example, that a triangular outer periphery of the nozzles is selected, by way of which even more precisely fitted adaptation to the external shape of the round cells is possible. For example, a triangular basic shape of the outer periphery having concave lateral surfaces, which are thus curved inward, can be provided, by way of which a maximally adapted geometry is achieved for the holding of the adjoining round cells.

With regard to the cell holder in the region of such a nozzle, the battery module is preferably distinguished by the following additional a.:

a. a perforated disk is arranged at the end of the nozzle facing away from the round cells.

The perforated disk ensures here, on the one hand, the air passage in this region, wherein expediently a central hole is provided in the perforated disk, which permits the air entry or air exit into or out of the nozzle. In addition, the perforated disk is designed such that it enables more extensive fixing of the round cells within the battery block or in the cell holder. For this purpose, the diameter of the perforated disk is preferably selected such that the perforated disk protrudes partially over the region of the cell holder in which a recess is provided for contacting the round cells. Protruding over such recesses in this way prevents the round cell arranged in the region of this recess from being able to slip through the recess. This is very advantageous in particular in the larger circular recesses described further above, which are provided to accommodate the negative poles of the round cells and can approximately correspond in their size to the diameter of the cylindrical body of the round cells.

In other configurations of the cell holder, in which possibly an example of the air passage openings without the described nozzles is implemented, such perforated disks can also be provided, which are used to hold the round cells.

Furthermore, the perforated disks can be helpful in the region of the air passage openings or in the region of the nozzles, to facilitate the installation of contacting plates possibly required for later contacting in the course of manufacturing. Such contacting plates can have, for example, corresponding inverted recesses that correspond to the perforated disks. In this way, the contacting plates can be put on and installed accordingly, wherein the correct orientation and fixing of the contacting plates is predetermined by the perforated disks of the cell holder and the corresponding recesses in the contacting plates.

Further particularly preferably, the battery module is distinguished with regard to the cell holder by additional a.:

a. the cell holders have spacers, in particular spaces in the form of protrusions, for spacing apart battery blocks stacked on one another and/or for spacing apart the stack made of battery blocks from walls of the housing.

The required areas for the provided airflow can be provided in a particularly simple manner by such spacers. In particular, the stack intermediate space or spaces between battery blocks stacked on one another and the terminal free spaces between a terminal battery block and the corresponding wall of the housing of the battery module can be produced by such spacers. These spacers are an integral part of the cell holders here so that no further components are required to effectuate these distances or implement the corresponding spaces within the battery module during the assembly. This facilitates the assembly of the battery module. It can be provided here that the spacers are incorporated into the pattern of the air passage openings.

Further particularly preferably with regard to these spacers, the regions of the spacers can additionally be used to provide suitable configurations in these regions to implement fixing and preferably a screw connection of the cell holder parts of a battery block to one another and possibly the fixing of the entire module including the housing. In particular, the continuous channels already explained can be provided for this purpose in the region of the spacers, which are suitable for a screw connection, preferably by self-tapping screws. If the spacers are placed in the pattern of the air passage openings of the cell holder and the spacers are combined with a channel for fixing, in this example an air passage opening is replaced by a spacer.

Depending on dimensioning and application, multiple spacers are advantageously provided per cell holder or per battery block, to ensure the areas for the airflow. For example, twelve spacers distributed uniformly over the area of the cell holder or the battery block can be provided. These twelve spacers preferably represent the screw connection regions at the same time. In this example, six channels can be used for a screw connection of the upper and of the lower cell holder part of a battery module. The other six channels can be used to fix of the entire battery module, thus, for example, for a screw connection of two battery blocks to the housing.

The battery module is distinguished with regard to the cell holder in a particularly preferred manner by additional a.:

a. the cell holders are manufactured from plastic, in particular from a polycarbonate or a mixture with polycarbonate.

The manufacturing of the cell holder from plastic is particularly suitable since the required geometry of the cell holder can be produced in a simple and cost-effective manner, for example, by injection molding or other suitable methods. Moreover, plastic is a light material that does not contribute significantly to the weight of the complete battery module. Furthermore, plastic is electrically insulating so that plastic is particularly suitable for the battery module. For example, the cell holder can be manufactured from polycarbonate or a mixture with polycarbonate. However, other plastics or possibly other materials are also suitable for manufacturing the cell holder.

Particularly preferably, the battery module is distinguished by additional a.:

a. the round cells of a battery block are arranged in offset rows, wherein the round cells of adjacent rows with opposing polarity are located adjacent to one another.

This arrangement and orientation of the round cells is suitable in a particularly advantageous manner for the interconnection of the round cells. By way of this arrangement, positive and negative poles of offset adjacent cells can be interconnected with one another in a way in a zigzag pattern. If, for example, twelve round cells are each arranged in parallel in a row and twelve round cells with opposing polarity are arranged offset thereto in an adjacent row, with a total of 192 round cells arranged in this way, sixteen round cells can be interconnected with one another in series (16S12P).

Particularly preferably, the round cells are secondary lithium-ion cells, which are already often utilized for uses in the form of battery modules.

For the operation of battery modules, in general a battery management system is advisable and/or required to control and/or to regulate the various parameters in the operation of a battery module. It is therefore expediently provided that the battery module has electronic components in a way known per se and/or that the battery module is provided for operation using a battery management system in a way known per se. The battery management system may be used to monitor the safety of the battery module. In particular, the battery management system can monitor the battery charge level (state of charge—SOC) and the aging condition (state of health—SOH). Important parameters for monitoring are the cell voltages, the cell currents, and the cell temperatures. The safe operation of the battery module can be ensured by monitoring such parameters in that, for example, a shutdown takes place in the event of overvoltage or undervoltage, in the event of excess temperature or insufficient temperature or the equalization of the charge level of individual round cells of the battery module.

I furthermore provide a cell holder that accommodates a plurality of cylindrical round cells that arranges the cylindrical round cells in the form of a battery block. This cell holder is distinguished by a. and b.:

a. the cell holder comprises receptacles that hold the cylindrical round cells, wherein the longitudinal axes of the cylindrical round cells lie in parallel to one another, and b. air passage openings are provided in the cell holder, through which air can flow through the battery block in parallel to the longitudinal axes of the round cells.

This cell holder is provided in particular to hold the cylindrical round cells in a battery block used in a battery module according to the above description. The above-described cooling principle for air cooling of the battery module may be implemented using this cell holder, wherein the cell holder can be used in particular in combination with the above-described guiding means to control the airflow within the battery module.

The cell holder is particularly advantageously in two parts, wherein a first cell holder part and a second cell holder part each enclose the opposing end faces of the round cells of the battery block.

Screw connections are preferably provided to fix the individual parts of the cell holder.

The cell holder is provided in a particularly preferred manner with a plurality of recesses used to electrically contact the round cells, wherein possibly recesses of different sizes can be provided for the negative poles and the positive poles of the round cells.

The regions of the air passage openings of the cell holder are preferably formed by nozzles that protrude into the interior of the cell holder. Three round cells adjoin each of the nozzles of the cell holder in the assembled state of the battery block so that the nozzles form a holding means for the round cells.

The end of the nozzle facing away from the round cells is preferably formed by a perforated disk which, in addition to the air passage function, also assumes a fixing function for the round cells in the battery block.

Furthermore, it is preferred that the cell holder has spacers in particular in the form of protrusions to implement the spaces required for the air guiding between battery blocks stacked on one another (stack intermediate spaces) and between terminal battery blocks of the stack and the housing (terminal free spaces).

The cell holder is preferably manufactured from plastic, for example, from a polycarbonate or a mixture with polycarbonate.

In addition, the cell holder is preferably designed such that the round cells of the battery block can be arranged in offset rows, wherein the round cells of adjacent rows with opposite polarity are located adjacent to one another. This can be achieved, for example, in that a corresponding pattern of larger and smaller circular recesses is provided in the cell holder, wherein the larger recesses are provided for the insertion of a round cell with an orientation of the negative pole to the respective part of the cell holder and a recess having smaller diameter is provided for the insertion of a round cell with the orientation of the positive pole to the respective part of the cell holder. Reference is made to the above description with respect to further features and advantages of this cell holder.

Further features and advantages result from the following description of examples in conjunction with the drawings. The individual features can each be implemented here on their own or in combination with one another.

FIG. 1 shows a schematic sectional view of a battery module 100 having two battery blocks 10 and a housing 13. Each battery block 10 consists of a plurality of cylindrical round cells 11 arranged in parallel to one another. The round cells 11 are arranged such that spaces 12 result between the individual round cells, through which air can flow through the battery blocks 10 in parallel to the longitudinal axes of the round cells 11. An air inlet 14 and an air outlet 15 are provided in the housing 13 of the battery module. The airflow (arrows 500) is guided by corresponding guiding means 16 and 17 such that it is initially conducted via the air inlet 14 between the two battery blocks 10 into the stack intermediate space 18. From this stack intermediate space 18, the air passes through the battery blocks 10 along the spaces 12 between the round cells 11 into the terminal free spaces 19, which result on the upper side and lower side of the battery module 100 between the respective battery blocks 10 and the wall of the housing 13. Via these terminal free spaces 19, the air moves in the direction of the air outlet 15 and leaves the battery module 100. In this configuration, the airflow 500 is driven by a fan 20 arranged at the air outlet 15.

Figure 2:
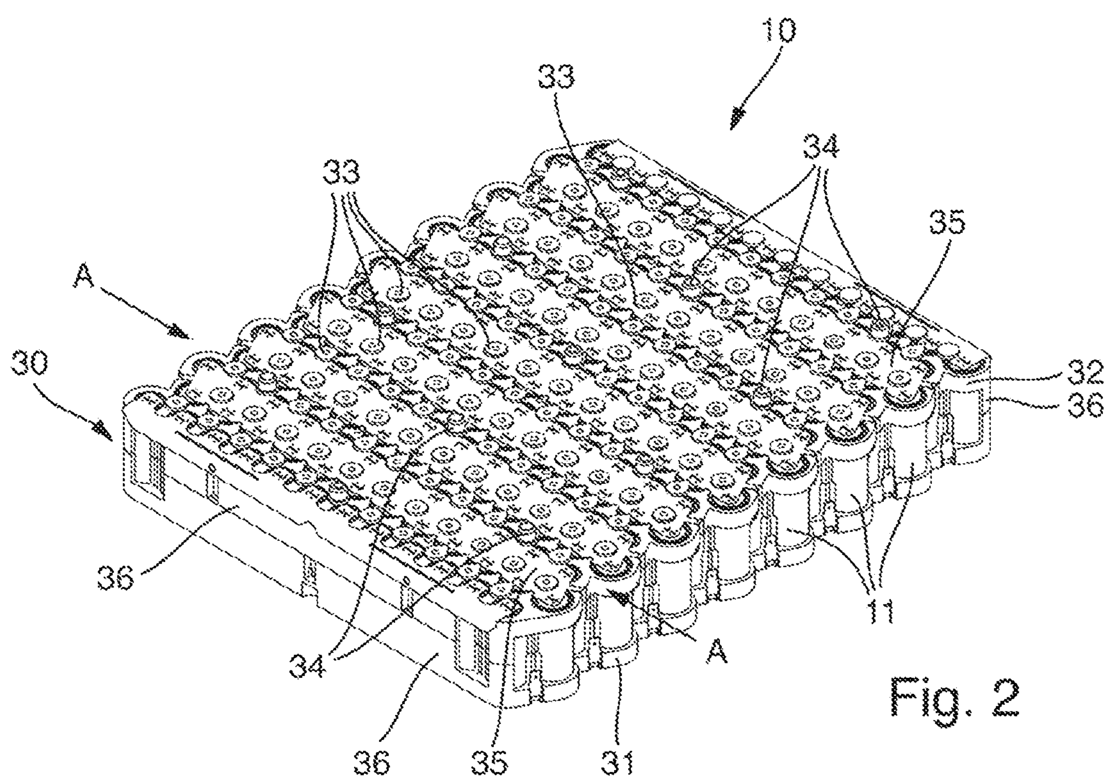
FIG. 2 shows an isometric view of a battery block as part of the battery module in a diagonal view.

FIG. 2 shows an isometric diagonal view of a battery block 10 in one example. The round cells 11 are arranged in a regular pattern in multiple rows and are held by a cell holder 30. The cell holder 30 is embodied in multiple parts having a lower cell holder part 31 and an upper cell holder part 32. The upper side and the lower side of the cell holder 30 or the upper cell holder part 32 and the lower cell holder part 31 are provided with a plurality of air passage openings 33, wherein the air passage openings 33 are designed so that air can move into the intermediate spaces between the individual round cells 11. An air passage opening 33 is provided for each intermediate space between the individual round cells 11 on both sides of the cell holder 30 so that the air can flow through the battery blocks 10 in parallel to the longitudinal axes of the round cells 11.

A plurality of spacers 34 in the form of protrusions is provided on the upper side and the lower side of the cell holder 30 or on the upper cell holder part 32 and the lower cell holder part 31. The spacers 34 are placed in the pattern of the air passage openings 33. In this configuration of the battery block 10, there are a total of twelve spacers 34 on each side of the cell holder 30. The required spaces for the airflow between battery blocks 10 stacked on one another and between the battery blocks 10 and the housing 13 of the battery module are implemented by these spacers 34. Strip-shaped contacting plates 35 are provided on the upper side and the lower side of the battery block 10, with the aid of which the contacting of the individual round cells 11 and their interconnection takes place.

The arrangement of the individual round cells in this example takes place in rows of twelve round cells 11 each that are each arranged in the same orientation. In the adjacent row, twelve round cells are also arranged offset thereto, but with reversed polarity. In total, 16 such rows are provided, wherein a serial interconnection of sixteen round cells 11 over the rows in a zigzag is provided.

To stabilize the cell holder 30, the upper cell holder part 32 and the lower cell holder part 31 have spacer elements 36 in the lateral regions.

Figure 3:
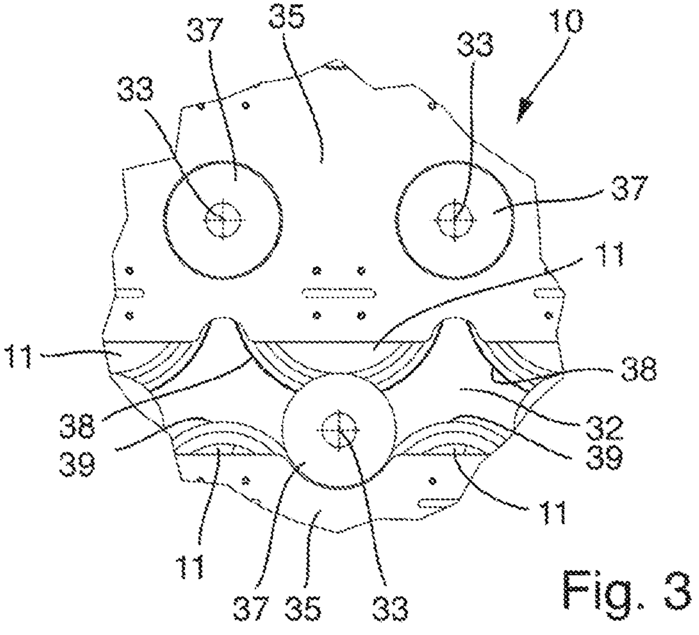
FIG. 3 shows a detail view of a detail as a top view of the battery block from FIG. 2.

FIG. 3 shows a detail view of a top view of the cell block 10 from FIG. 2. Three air passage openings 33 are shown that are each arranged by a perforated disk 37 on the upper side of the upper cell holder part 32 shown. Circular recesses 38 and 39 are provided in the upper cell holder part 32, in which the individual round cells 11 are inserted. The larger recesses 38 are provided for the negative poles of the round cells 11 and smaller circular recesses 39 are provided for the protruding positive poles of the round cells 11, in which the positive poles engage. The perforated disks 37 can protrude over the recesses 38 and possibly also the smaller recesses 39 in the region of the air passage openings 33 and thus prevent the round cells 11 from being able to fall out of the recesses 38, 39 in particular during the assembly.

The air passage openings 33 continue in the interior of the cell holder part 32 in the form of short nozzles. Three round cells 11 adjoin each nozzle in the region of the air passage openings 33. These nozzles are used here for both channeling the airflow and holding the round cells 11.

Contacting of the round cells 11 takes place with the aid of the contacting plates 35 arranged on the surface of the respective cell holder part. All poles of one polarity are fastened using a resistance weld on the contacting plates 35.

FIG. 4 shows a sectional view through the battery block 10 from FIG. 2 along A-A. The cell holder 30 assembled from the upper cell holder part 32 and the lower cell holder part 31 can be seen. Air passage openings 33 are arranged in regular intervals in the cell holder parts 31 and 32, through which the air can flow through the battery block 10 between the round cells 11. The air passage openings continue as short nozzles 40 in the interior of the cell holder 30. The nozzles 40 are used to hold the round cells 11, in addition to channeling the airflow. In some regions of the cell holder 30, continuous channels 41 are formed instead of the short nozzles 40. These channels 41 are provided for the engagement of self-tapping screws 42, with the aid of which the upper and the lower cell holder parts 32 and 31 are screwed together.

In addition, individual protrusions, which are used as spacers 34, are located on the upper side and the lower side of the cell holder 30. The continuous channels 41 for the screw connection are also provided in these regions of the spacers 34. In addition to the channels for a screw connection of the lower and the upper cell holder part 31 and 32 to one another, further continuous channels are provided at other points in the cell holder 30 provided for a screw connection of the battery blocks 10 to the housing 13.

FIGS. 5*a* and 5*b* show, in partial view A, a top view of the lower cell holder part 31 and, in partial view B, a side view of the lower cell holder part 31. The pattern of the circular recesses 38 and 39 can be seen, wherein the larger recesses 38 are provided to accommodate the negative poles of the round cells and the smaller recesses 39 are provided to accommodate the positive poles of the round cells. The air passage openings 33, which are each bounded by the perforated disk 37, are each located adjoining three recesses 38, 39. The spacers 34 in the form of protrusions, which simultaneously identify the regions having continuous channels in the cellblock, which are used for fixation, are distributed uniformly over the surface of the cell holder part 31. The air passage openings 33 continue in the interior of the cell holder part 31 through the short nozzles.

Figures 6A, 6B:
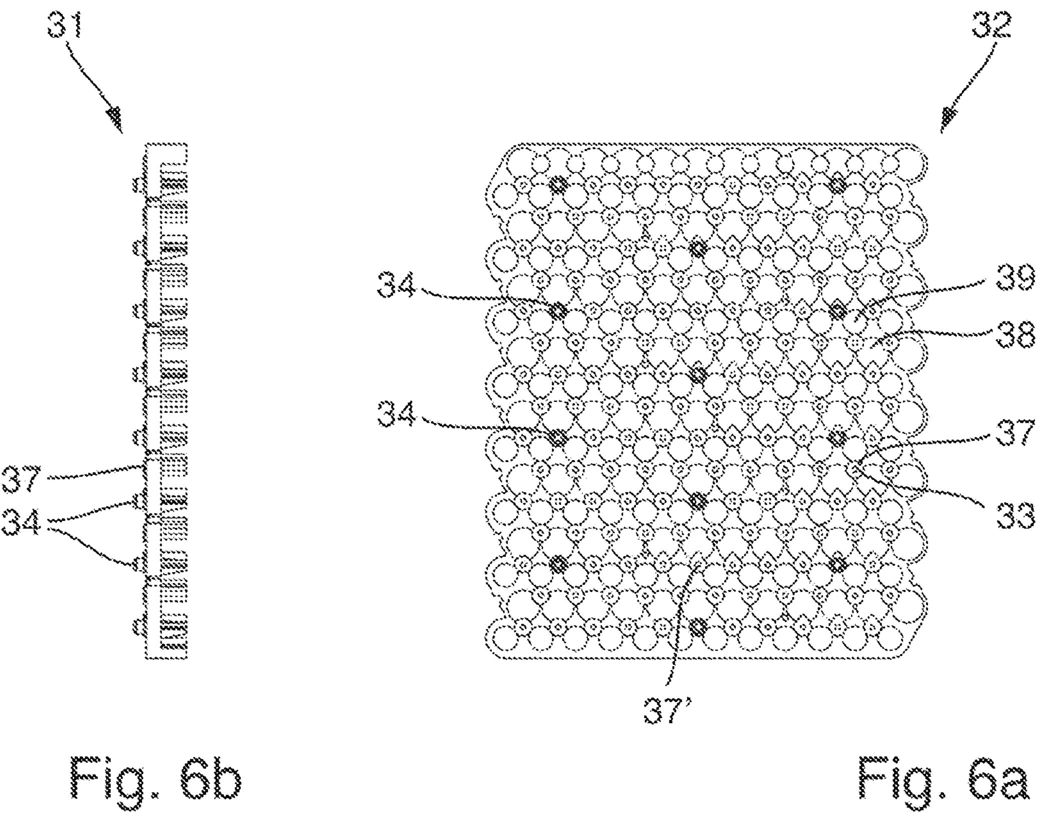
FIGS. 6*a* and 6*b* show a top view (A) and a side view (B) of an upper cell holder part.

FIG. 6 shows, in partial view A, a top view of the upper cell holder part 32. The arrangement of the larger and smaller circular recesses 38, 39 is comparable to the lower cell holder part 31 shown in FIG. 5, wherein in the assembled position of the cell holder parts 31 and 32, a larger recess 38 of the one cell holder part is located opposite to a smaller recess 39 of the other cell holder part so that a round cell can be fixed with its negative pole and its positive pole in between. In a corresponding manner as in the lower cell holder part 31, the air passage openings 33 having the perforated disks 37 are also distributed in the upper cell holder part 32 in a regular manner. Some of the perforated disks 37 can be formed in droplet shape 37', to enable improved holding of the round cells and possibly the contacting plates. The spacers 34, which also offer the fastening possibilities in particular for self-tapping screws, are also located in the upper cell holder part 32 at corresponding positions as in the lower cell holder part 31.

Figure 7:
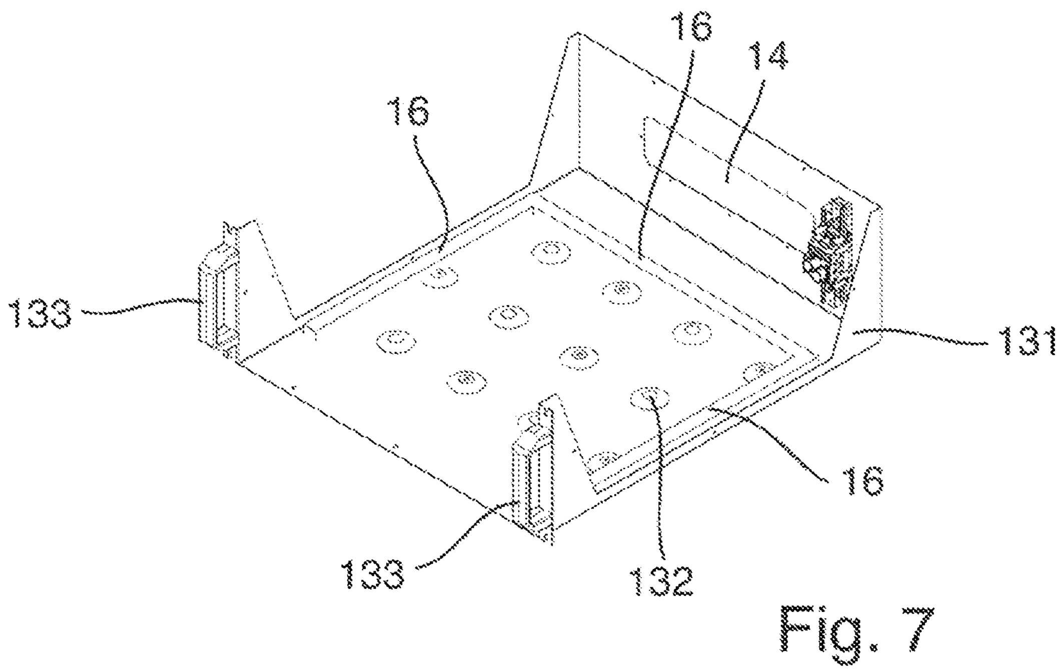
FIG. 7 shows an isometric diagonal view of the lower housing part of a battery module.

FIGS. 7 to 10 illustrate the overall structure of the battery module 100 and the arrangement of the guiding means 16, 17 within the battery module. FIG. 7 shows a lower housing part 131 for the battery module. A narrow side of the lower housing part 131 is formed as a side having the air inlet 14. Multiple holes 132, which are used for the fixing or screw connection of the battery module, are arranged in depressions of the housing surface on the surface of the lower housing part 131 which will form the lower side of the battery module 100. Two handles 133, using which the fully assembled battery module 100 can be handled, are provided on the side of the lower housing part 131 opposite to the air inlet 14.

On the inner side of the surface of the lower housing part 131, a three-sided frame made of foam is attached, for example, adhesively bonded, as the guiding means 16. The guiding means 16 formed as a three-sided frame is open on the side opposite to the air inlet 14 and closed on the remaining three sides. This three-sided frame acts as a sealing means and thus guides the airflow in the desired manner.

Figure 8:
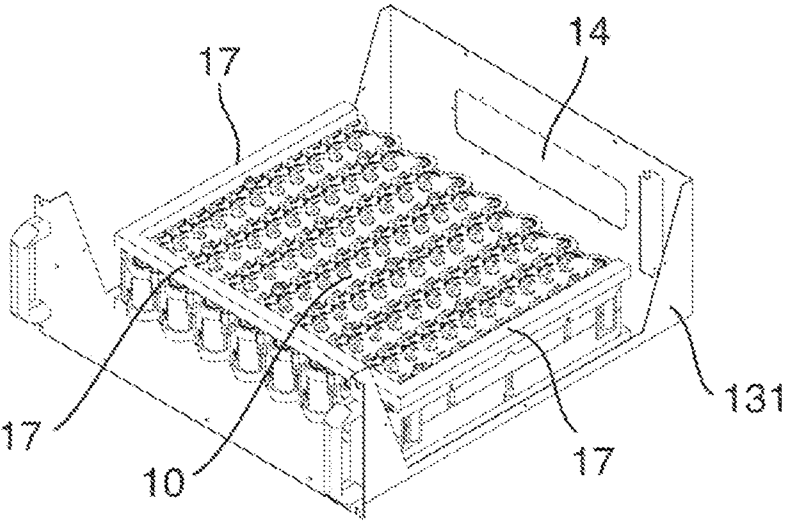
FIG. 8 shows an isometric diagonal view of the lower housing part from FIG. 7 having an inserted, first battery block.

FIG. 8 shows the lower housing part 131 of the battery module 100, in which a first battery block 10 is inserted. This battery block 10 corresponds in this example to the battery block 10 shown in detail in FIG. 2.

On the upper side of the battery block 10, a further three-sided foam frame is arranged as the guiding means 17 on three sides. This guiding means 17 is open toward the side of the air inlet 14 and closed on the remaining three sides.

Figure 9:
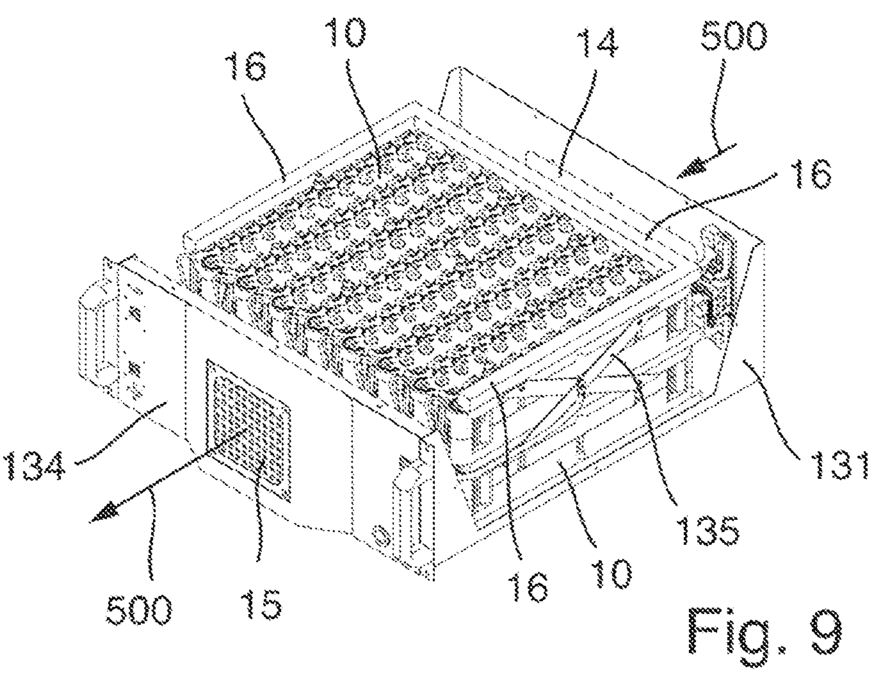
FIG. 9 shows an isometric diagonal view of the lower housing part from FIG. 7 having two inserted battery blocks.

FIG. 9 shows the lower housing part 131 having the first and the second inserted battery block 10. Furthermore, the end face 134 of the housing of the battery module opposite to the air inlet 14 is installed. The air outlet 15 is located on this end face 134. The two battery blocks 10 located one above another are fixed on one another by transverse struts 135. A further three-sided foam frame is arranged as a further guiding means 16 on the upper side of the second battery block 10. This three-sided frame is open toward the side of the air outlet 15 and closed on the remaining three sides. Due to the arrangement of the guiding means 16, 17, the air moves via the air inlet 14 through the individual battery blocks 10 into the battery module and flows through the battery blocks 10 between the individual round cells into the terminal regions of the battery module. The air moves in the direction of the air outlet 15 through the terminal free spaces between the respective battery blocks 10 and the inner walls on the upper and the lower side of the battery module. The direction of the airflow is indicated by the arrows 500.

Figure 10:
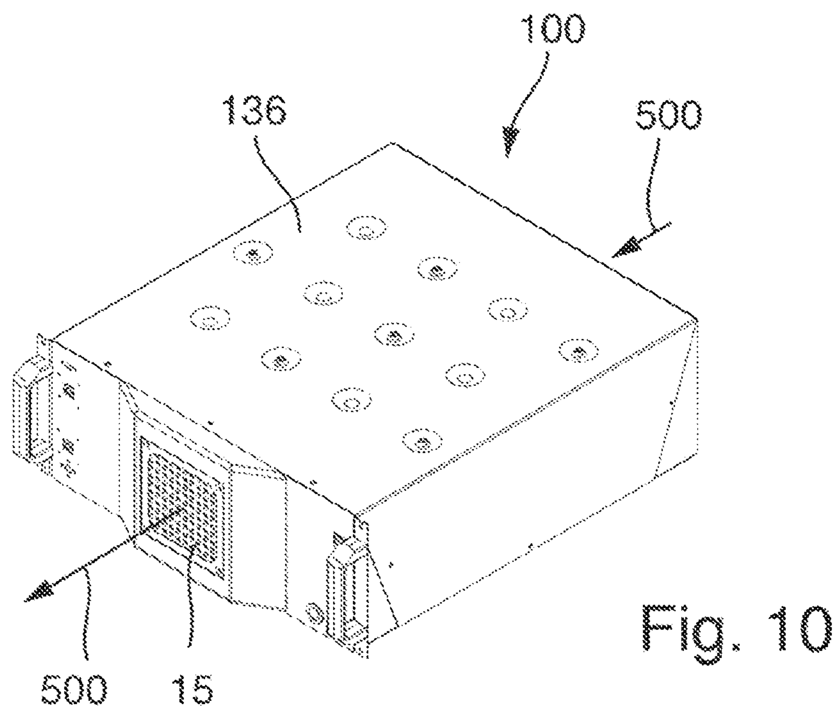
FIG. 10 shows an isometric diagonal view of an assembled battery module.

FIG. 10 shows the fully assembled battery module 100 including the upper housing part 136. The airflow 500 can be driven, for example, by a suctioning fan in the region of the air outlet 15.

The invention claimed is:

1. A battery module with air cooling capability comprising:

(a) at least two battery blocks;

(b) wherein the battery blocks each comprise a plurality of cylindrical round cells arranged in corresponding receptacles of a cell holder, wherein longitudinal axes of the cylindrical round cells lie parallel to one another;

(c) wherein air passage openings are provided in the cell holders, through which air can flow through the battery blocks in parallel to the longitudinal axes of the round cells;

(d) wherein the battery blocks are stacked on one another with spacing so that a stack intermediate space results between adjacent battery blocks in the stack;

(e) a housing comprising containing the stack made up of the battery blocks, wherein the stack is spaced apart from walls of the housing so that two terminal free spaces result between terminal battery blocks of the stack and the walls;

(f) wherein the housing has at least one air inlet and at least one air outlet;

(g) a fan assigned to the battery module to generate an airflow between the at least one air inlet and the at least one air outlet, and (h) guiding means that ensure that the airflow is guided starting from the stack intermediate space between two adjacent battery blocks through the air passage openings in the cell holders between the cylindrical round cells of the individual battery blocks and through the terminal free spaces in a direction of the at least one air outlet; and (i) wherein regions of the air passage openings of the cell holders are each formed by a nozzle that forms air entry and air exit channels, wherein each nozzle adjoins three cylindrical round cells of the respective battery block, and wherein the nozzles, together with recesses in the cell holders, form the receptacles for the cylindrical round cells such that the cylindrical round cells are delimited and fixed in position by the nozzles without requiring additional holding means.

2. The battery module as claimed in claim 1, wherein the guiding means are arranged peripherally on three sides in the stack intermediate space between two battery blocks located one on top of the other and/or peripherally on three sides in the terminal free space between a terminal battery block of a stack and the wall of the housing.

3. The battery module as claimed in claim 2, having at least one of:

(a) the guiding means in the stack intermediate space between two battery blocks located one on top of the other leave the side of the stack free which faces toward the at least one air inlet of the housing; and (b) the guiding means in the terminal free space between a terminal battery block of the stack and walls of the housing leave the side of the stack free which faces toward the at least one air outlet of the housing.

4. The battery module as claimed in claim 1, wherein the guiding means are sealing means formed from a flexible material or a foamed plastic.

5. The battery module as claimed in claim 1 wherein the cell holder of a battery block is formed in two parts having a first cell holder part and a second cell holder part, and the first cell holder part and the second cell holder part each enclose the opposing end faces of the round cells of a battery block.

6. The battery module as claimed in claim 5, further comprising screw connections or screw connections having self-tapping screws provided to fix the first cell holder part and the second cell holder part.

7. The battery module as claimed in claim 1, wherein the cell holders have recesses or circular recesses to facilitate contacting the round cells.

8. The battery module as claimed in claim 7, further comprising a perforated disk arranged at an end of the nozzle facing away from the round cells.

9. The battery module as claimed in claim 1, wherein the cell holders have spacers or spacers in the form of protrusions that space apart battery blocks stacked on one another and/or space apart the stack made up of battery blocks from walls of the housing.

10. The battery module as claimed in claim 1, wherein the cell holders are manufactured from plastic or from a polycarbonate or a mixture with polycarbonate.

11. The battery module as claimed in claim 1, the round cells of a battery block are arranged in offset rows and the round cells of adjacent rows with opposing polarity are located adjacent to one another.

12. The battery module as claimed in claim 1, wherein the round cells are secondary lithium-ion cells.

* * * * *